Aug. 12, 1958  F. A. MILLER  2,847,131
AUTOMOBILE STORAGE
Filed Jan. 17, 1950  4 Sheets-Sheet 1

INVENTOR
FRED A. MILLER
BY
HIS ATTORNEY

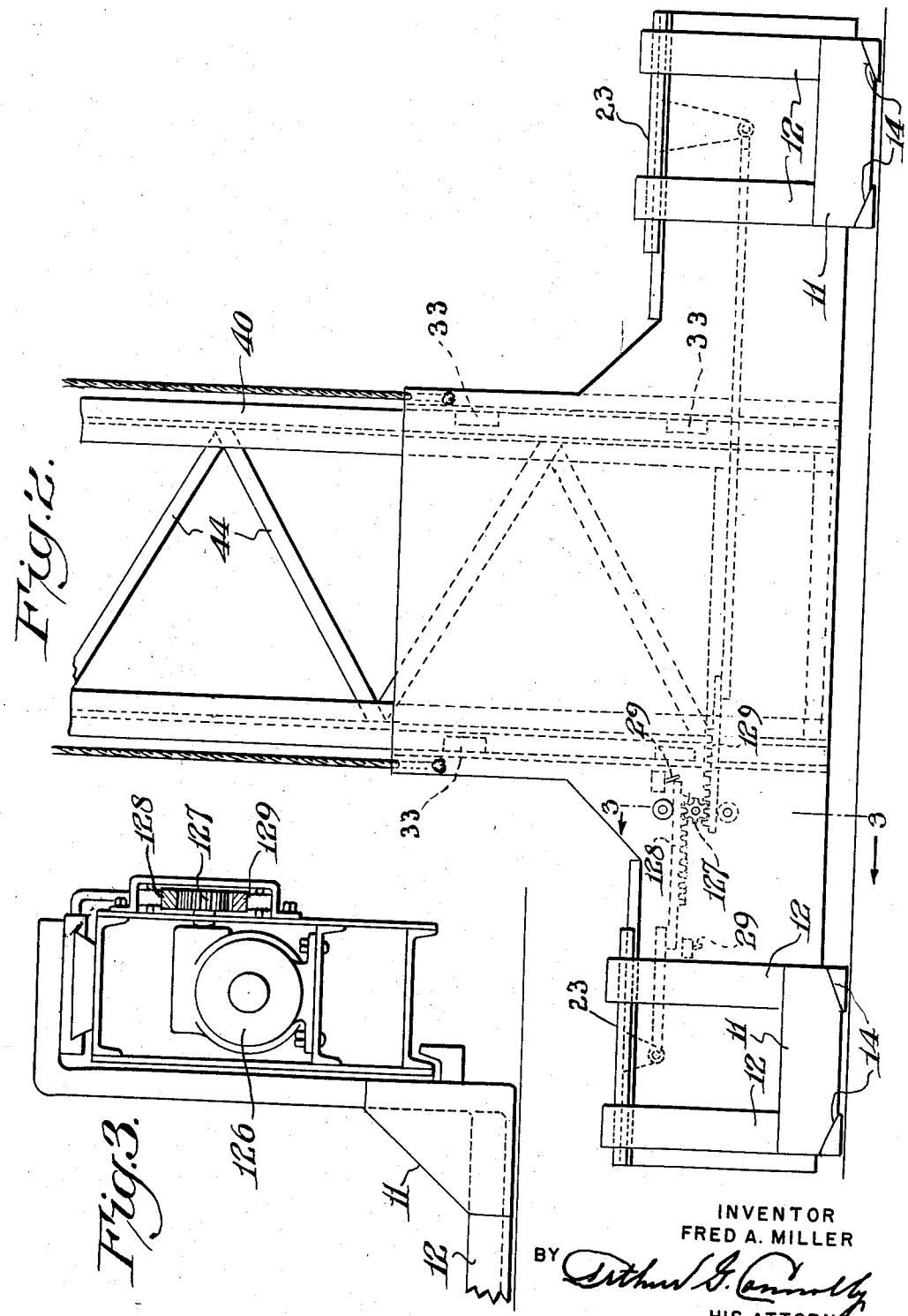

Aug. 12, 1958    F. A. MILLER    2,847,131
AUTOMOBILE STORAGE
Filed Jan. 17, 1950    4 Sheets-Sheet 3
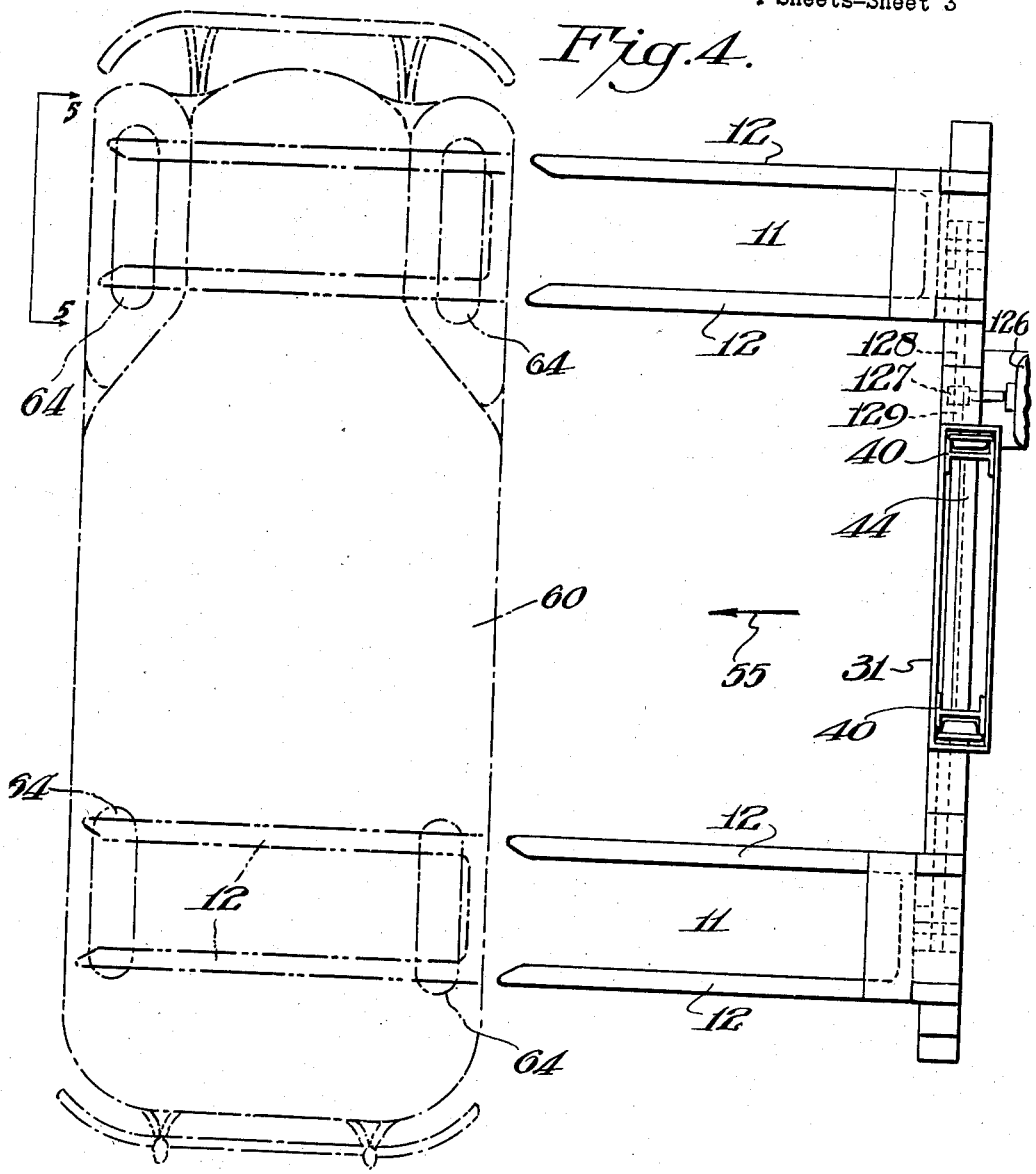
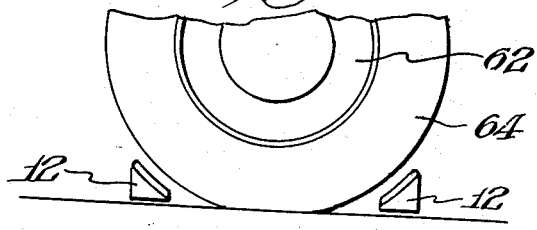
INVENTOR
FRED A. MILLER
BY
HIS ATTORNEY Aug. 12, 1958　　F. A. MILLER　　2,847,131
AUTOMOBILE STORAGE
Filed Jan. 17, 1950　　4 Sheets-Sheet 4

INVENTOR
FRED A. MILLER
BY
HIS ATTORNEY ns a method of
United States Patent Office 2,847,131
Patented Aug. 12, 1958

2,847,131
AUTOMOBILE STORAGE

Fred A. Miller, Wilmington, Del.; Leona Nell Miller, executrix of the estate of said Fred A. Miller, deceased Application January 17, 1950, Serial No. 139,065

3 Claims. (Cl. 214—16.1)

My present invention relates to the storage of automobiles. More particularly, it concerns a method of lifting, transporting and setting down automobiles in stacked relationship and a pick-up device that is used to engage the automobile for carrying out the method of the invention.

Owing to traffic congestion and limited parking facilities in our larger cities a great deal of attention has been directed to the problem of storing the maximum number of automobiles in a limited space within a building. Usually such storage garages are provided with several floors and with ramps or elevators to enable the automobiles to ascend and descend from floor to floor. It is necessary that a driver accompany the automobile, and much space is required for the floors, ramps, elevators and passages in the usual storage garages.

It has been proposed at various times to employ an overhead travelling crane for the purpose of raising and transporting the automobiles and then storing them in stacked relationship. Such suggestions are to be found, for example, in the U. S. Patents Nos. 1,938,658 to Harnischfeger, 1,874,859 to Been, 1,815,429 to Canaday and 1,781,955 to Porter. In these disclosures, opposed tiers of individual berths are provided for storing the automobiles in stacked relationship, and the overhead crane travels along the passage between the tiers of berths.

The foregoing prior art methods and devices have met with little success owing to inherent drawbacks having to do with the handling of the automobile. They have not successfully solved the problem of transferring the automobile from the lifting device to the storage rack and vice versa. It has either been necessary for an operator to be inside the automobile during the storage and return trips to and from the racks or that auxiliary transfer equipment, such as an individual platform, or a dolly and jack, be provided for each automobile.

The primary object of my invention is to overcome the above mentioned drawbacks and to provide a system whereby the automobiles may be rapidly lifted from a space at the front of a plurality of storage racks, transported to the desired individual berth and then deposited therein without requiring that an operator accompany the automobile or that special transfer equipment be used. Another object is to provide a pick-up device which can be inserted beneath the wheels of an automobile whose brakes are set and ignition locked, and used to raise and transport the automobile to a storage rack where the device can deposit it, withdraw itself, and be available either to move another automobile from its storage rack to the floor where it can be driven off, or to stack additional automobiles. A further object is a method whereby an automobile may be raised, transported to a desired location, stored at such location, removed therefrom and transported to the original starting place, all without operating the automobile in any way or employing special auxiliary transfer devices. Additional objects and advantages of my invention will become apparent from the following detailed description thereof.

I have accomplished the objects of my invention by constructing a specially designed pick-up device that is attached to a hoisting mast of a stacker crane, such as is described in my copending application Ser. No. 759,889, filed July 9, 1947, now Patent No. 2,553,378. In such a stacker crane the hoisting mast is mounted on a turntable built into the trolley bed of a conventional overhead bridge crane. The hoisting mast extends downwardly to a point just above the surface of the floor. The chief advantage of this design is that it permits the handling and stacking of any load in a minimum width operating aisle between tiers or rows of storage berths.

My pick-up device corresponds to the conventional fork lifting carriage but differs therefrom in several essential features. It may be attached to other hoisting masts, such as that of a fork lift truck, although the stacker crane appears to be by far the most desirable.

My pick-up device comprises a pair of horizontally spaced, two-pronged forks extending horizontally at right angles from a lifting carriage, and means for adjusting the distance between the forks. The prongs of the forks are somewhat longer than the tread width of the widest conventional automobile, and the distance between them is somewhat less than the diameter of the widest conventional automobile wheel and tires. The distance between the forks can be adjusted to correspond to the various wheel bases of the conventional automobiles. I prefer to have the prongs of my forks beveled at the upper opposed portions, so as to present a tapered surface, free of sharp angularities, upon which the automobile tire may rest.

For a full understanding of my invention reference should be had to the accompanying drawings wherein—

Fig. 2 is a front view of a modified pick-up device showing a different form of fork adjusting means and/or more clearly illustrating the beveling of the fork prongs.

Fig. 3 is a section along the line 3—3 of Fig. 2, disclosing details concerning the manner of affixing the fork to the lifting carriage.

Fig. 4 is a simplified plan view showing how the forks are inserted beneath the front and rear wheels respectively, of the automobile.

Fig. 5 is a fragmentary view looking in the direction of the arrows 5—5 of Fig. 4 showing how the beveling of the prongs facilitate insertion thereof underneath the automobile wheels and present larger surfaces upon which the tire rests.

Figure 1:
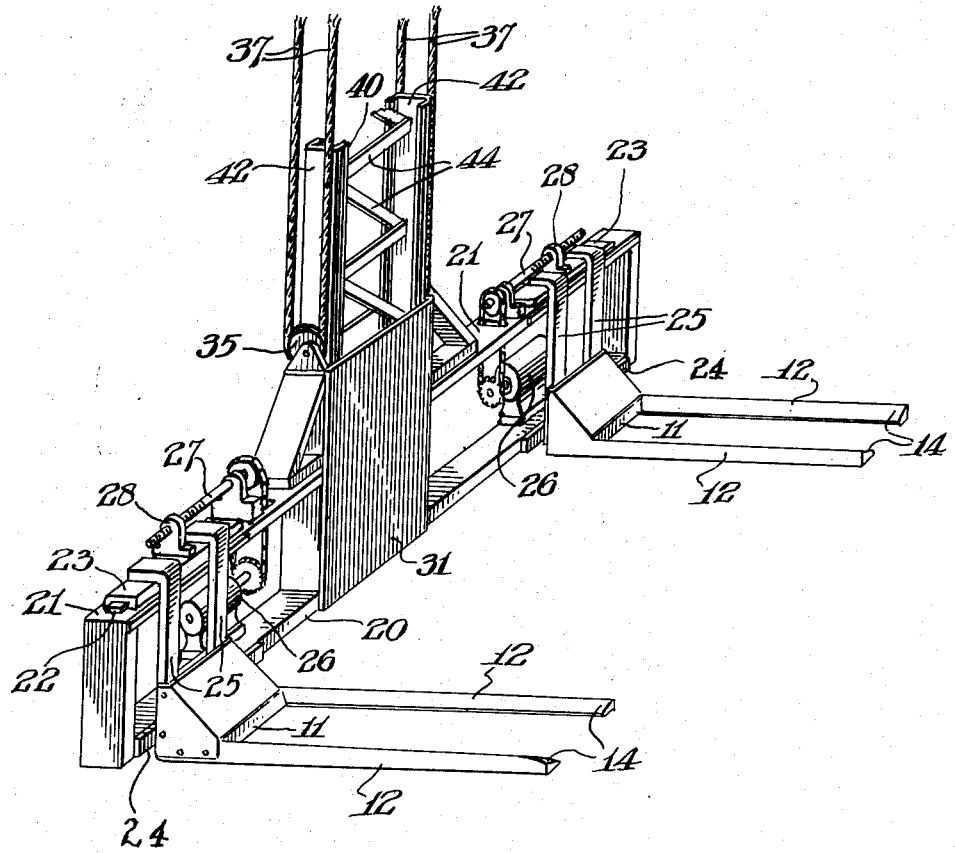
Fig. 1 is a perspective view of my novel pick-up device, showing in a general way the pair of two-pronged, lifting forks, the means on the lifting carriage for adjusting the distance between them, and the hoisting mast upon which said carriage rides.

Referring particularly to Fig. 1, 11 represents the forks each provided with a pair of prongs 12. The beveling of these prongs is indicated at 14. The forks 11 are attached to a lifting carriage 20, which is movably mounted upon a hoisting mast 40, only the lower end of which is shown.

For adjustably carrying the forks 11, the lifting carriage 20 is shown as including a pair of support beams 21 to each of which is fixed a slide plate 22 having side edges that taper outwardly in the upward direction. A movable slide plate 23 having its lower surface grooved to provide the complementary taper, is slidably fitted over the fixed plate 22 so that it can slide along a portion of the length of beam 21. The forks 11, 11 are each secured to a slidable plate 23 by means of the bars 25 the upper ends of which are bent to overly the movable plates 23 to which they are fastened as by welding. The lower ends of these bars carry the forks 11 as well as additional slide guides that engage slide or wear plates 24 secured to a lower portion of the carriage 20.

The adjustment between forks 11, 11 may be manually made and the adjustment need not be locked where only one fork is adjustable and the other is securely fixed in place to resist forces directed longitudinally of a car being carried by the forks. In Fig. 1 however electrically operated adjustment is provided by an electric motor 26 connected to rotate a screw 27 on which is threadedly received a block 28 that is fixed to the slidable plate 23. The electrically powered adjustment may be limited to one fork 11, with the other fork immovably held in place, or as shown, both forks may be adjustable.

Figs. 2 and 3 show a modified form of fork adjustment. Here a single motor 126 drives a pinion 127 that is engaged by two racks 128, 129 each separately connected to the different movable slide plates 23, 23. This provides simultaneous adjustment of both forks. Limit switches are shown at 29, 29 to automatically prevent the adjustment from proceeding too far in either direction.

The hoisting mast 40 shown in Fig. 1 includes a pair of channel-shaped members 42, 42 rigidly held in opposed spaced face-to-face position by transverse supports 44. The carriage 20 includes integrally held support plates 31, 31, closely over the front and rear faces of the mast 40, while other carriage members such as rollers 33 (Fig. 2) which may be mounted between the plates 31, 31, engage the sides of the mast and limit all but vertical movement of the carriage. Pulleys 35 are pivotally held on either side of the carriage for receiving hoisting cables 37 as in the conventional stacker crane. Further details of the stacker crane are conventional and are not shown in Figs. 1, 2 and 3 since any suitable arrangement can be used. My aforementioned copending patent application shows one highly effective construction for example. It suffices for present purposes, that the mast 40 together with the hoisting power unit for operating cables 37, are movable as a unit, in several horizontal directions, as by means of an overhead rail system.

The manner in which my pick-up device engages the wheels 62 of the automobile 60 can best be seen from Figs. 4 and 5. The initial position of the pick-up device is shown by unbroken lines in Fig. 4. By moving the entire carriage and mast assembly to the left as indicated by arrow 55, the forks 11 will be brought to the position indicated by the broken lines in that figure. Fig. 5 shows how the prongs of a fork will thus be inserted beneath the tire 64 of each wheel, so that they will support the latter, when the fork is raised. It is apparent from these figures that the forks of my pick-up device are first adjusted to the wheel base of the automobile and are then inserted from the side in such a manner that each fork supports the respective front or back pair of wheels with its prongs beneath the front and back portions of each tire.

It will be obvious that my pick-up device will serve to lift an automobile that has had its brake set and its ignition and doors locked, and will lift and carry it by supporting all four wheels. The automobile may be deposited at the desired location by lowering the forks until they just clear the supporting surface. At that point, the automobile tires again take up the load, and the forks may be retracted, leaving the automobile at the new location.

Figure 6:
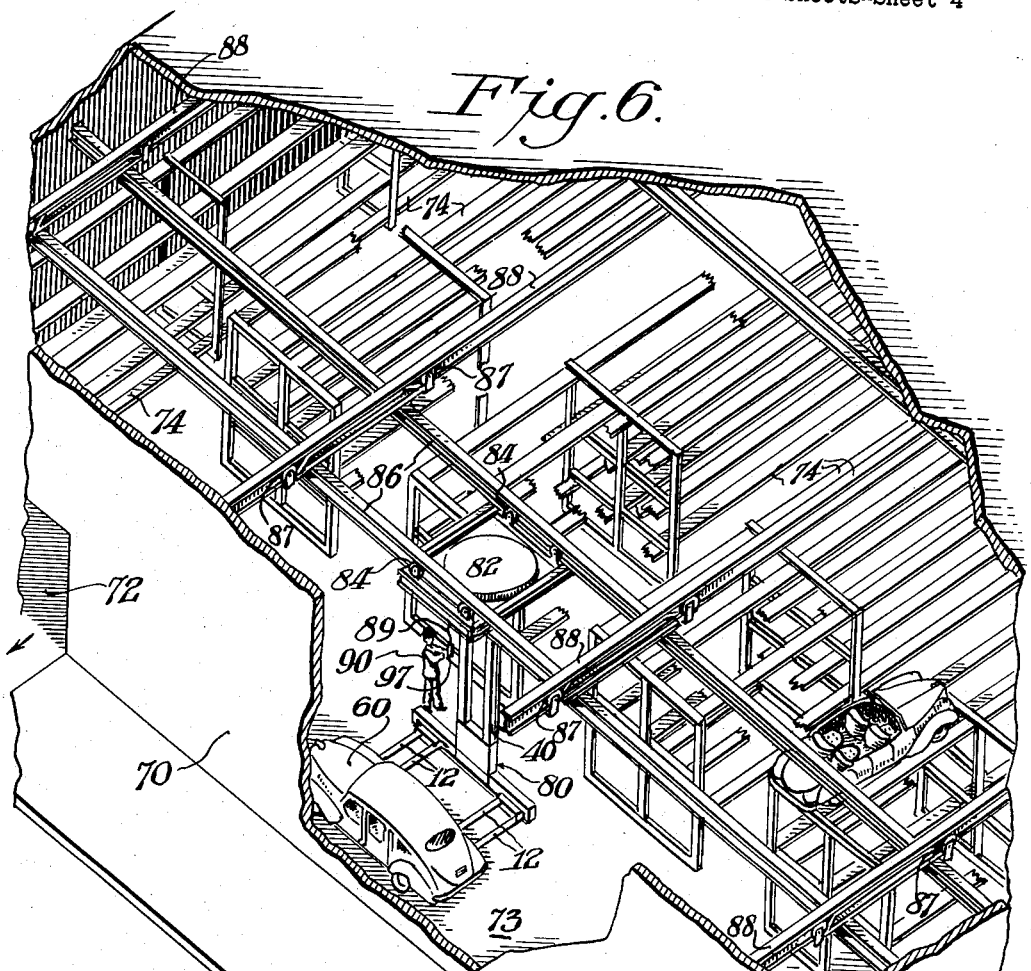
Figs. 6 and 7 are somewhat schematic perspective views showing a desirable arrangement of storage racks and the manner in which my pick-up device is employed in conjunction with a stacker crane to transport the automobiles to their individual berths.
Figure 7:
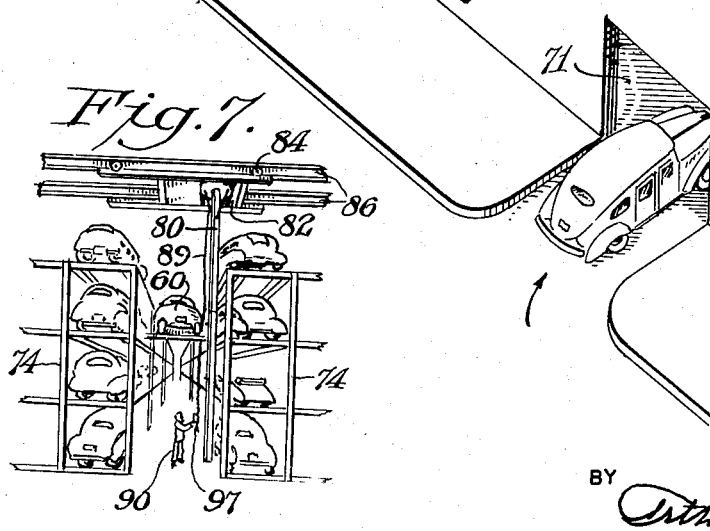

My method of lifting, transporting and storing automobiles is illustrated in connection with a stacker crane in Figs. 6 and 7. Fig. 6 shows a garage building 70 provided with storage racks 74 and a stacker crane 80 embodying the pick-up device of my invention. In Fig. 7 the stacker crane 80 is shown in operation. This figure clearly indicates how little width is required in the aisles between the storage racks and how little clearance there need be between the superposed racks.

A garage design for the operation of my method of storage, utilizing my novel pick-up device, will as shown in Fig. 6 have an entrance 71, an exit 72, with a space 73 between them at the front of the building, where the driver can leave and receive his automobile. A great advantage of my method is that upon leaving his automobile the driver may lock it securely and take the keys with him, thus making certain that no unauthorized entry or driving is done. From that point on the automobile is handled much in the same manner as any crate or large box would be by the conventional stacker crane or fork lift truck. However, the forks of my pick-up device are not inserted under the chassis of the automobile as this would damage the car and would permit its wheel springs to lower the wheels when the automobile is raised, thus requiring much greater vertical clearance between the superposed berths.

In Fig. 6 the stacker crane and pick-up device are shown in position for insertion of the prongs 12 beneath the front and rear wheels of a locked automobile 60. Before locking his automobile, the driver should set the brakes to avoid any danger that the automobile might roll on the storage rack. In Fig. 6 the forks have been adjusted, so that the distance between them corresponds to the wheel base of the automobile. The next step is to insert the forks laterally underneath the wheels by moving the entire crane towards the automobile. It can then be raised by elevating the carriage on the hoisting mast.

In the construction of Figs. 6 and 7, the stacker 80 includes a hoisting unit or trolley 82 mounted by rollers 84 on a pair of rails 86, 86 that extend across the width of the building. These rails 86, 86 are held together as a movable unit suspended by separate groups of rollers 87, 87 from a set of fixed rails 88, 88 that extend longitudinally of the building. In addition the hoisting unit 82 is so arranged that the hoisting mast 40 can be rotated at least 180 degrees about a vertical axis.

Each of the different types of movement is preferably electrically controlled as by independent electric motors. Thus three motors can be mounted on the hoisting unit 82, one for hoisting, another for mast rotation, and a third for propelling the hoisting unit along the transverse rails 86, 86. A fourth motor, or group of motors for effecting longitudinal movement along rails 88, 88 may be mounted on framework members that carry the rollers 87, 87 and tie the rails 86, 86 together to form a travelling assembly.

All the hoist-unit-actuating motors are connected for operation from a control box 97 that may be suspended by its connecting cable 89 from the hoisting unit 82 which is at a fixed elevation above the floor. The control box 97 which is provided with suitable motor-controlling switches can thus be positioned at a convenient level so that an operator 90 can readily operate the switches and easily walk along with the stacker as it moves.

After the automobile is raised from the floor, the stacker is moved along rails 86, 86 till the automobile is carried to the aisle along which it is to be berthed. The hoisting unit is then rotated around its vertical turning axis till the automobile is disposed longitudinally of the aisle, after which the entire crane assembly is moved along the longitudinal beams 88, 88 to the proper berth or stall. If necessary, the hoist is operated to adjust the height of the carried automobile to the floor of the desired berth and the hoisting unit again moved laterally to bring the automobile into the berth.

Fig. 7 shows an automobile 60 being transported down an aisle where it is to be placed in one of the berths in the third tier on the left hand side. Upon reaching the intended berth, the crane is moved sideways to the left to insert the automobile therein and the pick-up device is lowered sufficiently, so that the automobile rests on its tires. The stacker is then moved back to the right withdrawing the forks from the berth and freeing the crane for further operations. If the automobile were to be stored on the right hand side of the aisle, the hoisting mast would be on the opposite or left side of the automobile 60 and the operation correspondingly reversed. Obviously, the same steps are carried out in invese order when removing an automobile from its berth and delivering it to the driver at the front of the garage.

An important feature of the stacker crane which permits minimum width of the aisles, is the turn-table arrangement whereby the automobile can be turned after it is lifted. This makes it possible to turn the automobile into the aisle and to keep it on that side of the hoisting mast that corresponds to the side of the aisle in which the intended berth is located. It will be apparent that, while my pick-up device may be employed on a fork lift truck or the like, such other lifting machines would require considerably more space for maneuvering.

Another feature of the invention is that the stacking crane assembly can be provided with an automatic interlock control action to reduce the possibility of damage to automobiles or equipment. Thus the pick-up rotating motor together with the motor that effects longitudinal movement along rails 88, 88 can be so connected that they are both deenergized except when the hoist unit reaches the transverse position in which it is aligned with a longitudinal aisle, so that the automobile cannot be inadvertently impelled against the framework of an adjacent berth. Similarly transverse movement of the stacker along rails 86, 86 can be prevented except with the pick-up device at one of the correct levels (that of the berths or the garage floor) as well as at the longitudinal aisle positions in correct alignment with the berth openings. To simplify the transfer of automobiles, the beams 86, 86 and 88, 88 may be notched or otherwise treated so that an audible or visible indication is given when the hoisting unit or assembly reaches a step in its movement at which the direction of movement is changed. Such indications make convenient guides for the desired control manipulations of the operator 90 so that time consuming errors in estimating distances are avoided.

It is a further feature of the invention that all the steps of the automobile storage sequence can be arranged to be effected by automatic machinery. Thus a remote control box having push buttons corresponding to the individual stalls can be arranged to produce the desired movements in a manner similar to the operation of automatic elevators.

Insomuch as some automobiles to be stacked may have defective parking brakes or may be left locked with these brakes released, the berths are preferably arranged to prevent rolling of the stacked cars or to prevent damage should there be some tendency to roll. Thus each berth may be partitioned from the adjoining berths by a blocking member which harmlessly contacts the bumper of a berthed automobile that should happen to roll and stops the rolling before it can do any damage. Alternatively the berth floors may be accurately levelled and/or provided with upstanding protuberances to minimize any rolling tendencies.

The berth floors need not cover over the entire floor area of a beth, but, as indicated in Figs. 6 and 7, may be narrow strips that extend over only those floor portions upon which automobile wheels will be rested. These strips may extend longitudinally and be spaced transversely of each other with respect to the automobile length, as in Figs. 6 and 7, or conversely they may extend transversely and be spaced longitudinally.

As an added precaution the racks may be provided with fixed or movable ladder rungs or other climbing aids. Then in the event that a tire on which an automobile rests should become deflated after the automobile has been deposited in a storage berth, an operator may climb up to the level of the wheel carrying that tire and inflate it as by means of an easily carried container of compressed gas such as carbon dioxide. The automobile may then be safely removed from the berth to the floor level where more complete tire repairs may be made, if necessary. The above described climbing aids are not needed if the storage racks are only two tiers high, especially when the tier heights are minimized to crowd as many cars as possible into the available garage space.

It should be obvious from the foregoing that my novel pick-up device makes possible a safe, simple and economical method for storing automobiles. The method is distinguished from all previously known methods by the fact that the lifting means are inserted from one side of the automobile to positions beneath each pair of wheels and in front of and behind the region in which the wheels are in contact with the ground. Upon raising the lifting means the wheels are cradled between the supporting members, the lowermost portions of the wheels extend downwardly sufficiently beyond the forks to support the automobile and release the supporting prongs, when the forks are lowered to the floor or the bottom of the storage rack, as the case may be. Thus, by providing an adjustable pair of two-pronged lifting forks, I have overcome the disadvantages of the prior art methods. Much space is saved, it is unnecessary for an operator to ride in the automobile to effect transfer to or removal from a berth, and no special auxiliary transfer equipment is required. In addition the wheels of the automobile need not be accurately aligned. The forks will securely engage and lift the automobile even though the automobile's steerable wheels are cocked a considerable degree away from straight ahead.

It will be apparent that my method and device are subject to considerable modification without departing from the spirit of my invention. The characteristic feature of the device is the pair of two-pronged forks that may be inserted laterally beneath the front and back wheels respectively of the automobile while it rests on the floor. It is this cradling action that also serves to distinguish my method and which is responsible for the numerous advantages to be derived from the use of my invention.

The present invention also includes modification of the structures and methods described above. Thus the adjustment of the spacing between forks may be hydraulically effected, as by means of one or more electrically operated hydraulic cylinders connected to shift one or both of the forks toward or away from each other. Furthermore, the operator may ride on the pick-up unit, so that he is close at hand when the forks are being fitted under a berthed car or a car is being deposited in a berth. This will further diminish errors and correcting adjustments due to misjudgment of distances. For this purpose the pick-up unit may include a cage structure, at one or both ends for example, into and out of which the operator can readily move.

Other alternatives include the reduction in the rotation of the hoist carriage bed or its total elimination. Where the available garage width is so small as to only provide a single row of berths in addition to one aisle, there is no need for 180 degrees of rotation for the pick-up unit. Where the automobile loading and unloading apron is suitably positioned with respect to such a narrow garage space, hoist rotation can be entirely dispensed with. This would be the case where the single aisle provides a driveway into and out of which automobiles can be driven for storage or removal respectively. Where the automobiles are driven to or away at an appreciable angle to the aisle, hoist rotation is a considerable convenience but need not generally be more than 90 degrees.

As a still further modification of the invention, the garage berths may be used as described above without some or all of the external building walls shown in Fig. 6 for example. The uppermost berths may be covered to provide some protection of stored automobiles from the elements, or if desired such covers can also be omitted. In the absence of walls otherwise used to support the overhead rails, these rails may be supported on legs secured to the outermost or peripheral berths, or to suitable portions of the loading and unloading apron. The central portions of the garage should be kept free of rail supporting pedestals, so as to permit unrestricted traverse of the hoisting carriage.

As many apparently widely different embodiments of this invention may be made without departing from the spirit and scope hereof, it is to be understood that the invention is not limited to the specific embodiments hereof, except as defined in the appended claims.

I claim:

1. A method of storing automobiles which comprises simultaneously laterally inserting from one side of the automobile a pair of two-pronged lifting forks, one beneath the front pair of wheels and the other beneath the back pair, the prongs being so spaced that each side-by-side pair of wheels is cradled between the prongs of a different fork, raising the said forks to support and lift the automobile, transporting it while so supported down an aisle between superposed tiers of berths, inserting the automobile laterally while so supported into one of said berths, lowering the lifting forks until the automobile is supported by its wheels on the floor of the berth, and then laterally withdrawing said lifting forks from beneath the wheels, wherein the automobile, while cradled on the prongs of the lifting forks, is turned about a vertical axis so that it can be introduced lengthwise into the aisle between the opposed tiers of berths.

2. An automobile storage apparatus comprising a plurality of superposed tiers of elongated automobile storage berths, said storage berths being oriented into rows parallel to the longitudinal direction of the berths and separated by aisles, overhead guide structure above said tiers of berths, a rotatable stacker crane depending from said guide structure for movement into and out of the aisles and into and out of the berths, said crane including a hoisting mast and a lifting carriage mounted on said hoisting mast, said carriage having a pair of opposed laterally extending support arms each of which carries a two-pronged fork, the fork being long enough to extend under a side-by-side pair of wheels of an automobile, the arms being long enough to carry the forks spaced from each other by the length of an automobile's wheelbase, and operating mechanism being connected to the crane to adjust the spacing of the forks, the lifting of the carriage and the rotation of the crane about its support.

3. An automobile storage apparatus comprising a tier of elongated automobile storage berths, said storage berths being oriented into a row parallel to the longitudinal direction of the berths, a stacker crane supported for movement along the row and into and out of the berths, said crane including a hoisting mast and a lifting carriage mounted on said hoisting mast, said carriage having a pair of opposed laterally extending support arms each of which carries a two-pronged fork, the forks being long enough to extend under a side-by-side pair of wheels of an automobile, the arms being long enough to carry the forks spaced from each other by the length of an automobile's wheelbase, and operating mechanism connected to the crane to adjust the spacing of the forks and the lifting of the carriage.

References Cited in the file of this patent

UNITED STATES PATENTS

| 1,404,926 | Burnham | Jan. 31, 1922 |
| 1,594,368 | Jacobs | Aug. 3, 1926 |
| 1,768,360 | Jenney | June 24, 1930 |
| 1,903,274 | Watson | Mar. 28, 1933 |
| 2,177,941 | Knudson et al. | Oct. 31, 1939 |
| 2,271,624 | Cochran | Feb. 3, 1942 |
| 2,324,817 | Bratley | July 20, 1943 |
| 2,483,745 | Vossenberg | Oct. 4, 1949 |
| 2,535,961 | Schutt | Dec. 26, 1950 |
| 2,581,364 | Cushman | Jan. 8, 1952 |
| 2,629,507 | Olson | Feb. 24, 1953 |

FOREIGN PATENTS

| 317,293 | Germany | Dec. 13, 1919 |
| 530,933 | Germany | Aug. 3, 1931 |

OTHER REFERENCES

Seattle Post Intelligencer, page 21, Mar. 28, 1947, newspaper.